(12) United States Patent
Girardi et al.

(10) Patent No.: US 11,874,863 B2
(45) Date of Patent: Jan. 16, 2024

(54) QUERY EXPANSION IN INFORMATION RETRIEVAL SYSTEMS

(71) Applicant: INTERNATIONAL BUSINESS MACHINES CORPORATION, Armonk, NY (US)

(72) Inventors: Ivan Girardi, Birmensdorf (CH); Harold Douglas Dykeman, Richterswil (CH); Andrea Giovannini, Zurich (CH); Adam Ivankay, Zürich (CH); Chiara Marchiori, Birmensdorf (CH); Kevin Thandiackal, Gattikon (CH); Mario Zusag, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 16/839,131

(22) Filed: Apr. 3, 2020

(65) Prior Publication Data
US 2021/0286831 A1 Sep. 16, 2021

Related U.S. Application Data

(60) Provisional application No. 62/987,758, filed on Mar. 10, 2020.

(51) Int. Cl.
*G06F 16/33* (2019.01)
*G06N 3/049* (2023.01)
*G06N 20/20* (2019.01)

(52) U.S. Cl.
CPC ......... *G06F 16/3338* (2019.01); *G06N 3/049* (2013.01); *G06N 20/20* (2019.01)

(58) Field of Classification Search
CPC .................................................. G06F 16/3368
(Continued)

(56) References Cited

U.S. PATENT DOCUMENTS 8,401,841 B2    3/2013   Roitblat
2008/0059187 A1*   3/2008   Roitblat .............. G06F 16/3344
                                                                        707/999.005

(Continued)

FOREIGN PATENT DOCUMENTS

CN         109829104 A     5/2019

OTHER PUBLICATIONS

Diaz, "Query Expansion with Locally-Trained Word Embeddings," Proceedings of the 54th Annual Meeting of the Association for Computational Linguistics, pp. 367-377, Berlin, Germany, Aug. 7-12, 2016.

(Continued)

*Primary Examiner* — Hosain T Alam
*Assistant Examiner* — Tracy M McGhee
(74) *Attorney, Agent, or Firm* — Steven M. Bouknight (57) ABSTRACT

The present disclosure relates to a method for query expansion. The method comprises: a) receiving a current query having at least one search term; b) inputting the at least one search term of the current query to a set of one or more query expansion modules, wherein the query expansion modules are configured to predict expansion terms of input terms; c) receiving from the set of expansion modules candidate expansion terms of the search term; d) modifying the current query using at least part of the candidate expansion terms, resulting in a modified query having at least one modified search term, The method further comprises repeating steps b) to d) using the modified query as the current query, the repeating being performed until a predefined stopping criterion is fulfilled.

10 Claims, 6 Drawing Sheets

(58) Field of Classification Search
USPC .......................................................... 707/765
See application file for complete search history.

(56) References Cited

U.S. PATENT DOCUMENTS

2018/0260414 A1* 9/2018 Gordo Soldevila .. G06F 16/532
2019/0130023 A1* 5/2019 Kataria ................ G06F 16/338

OTHER PUBLICATIONS

Imani et al., "Deep Neural Networks for Query Expansion using Word Embeddings," Computer Science, Published in ECIR 2018, DOI: 10.1007/978-3-030-15719-7_26, pp. 1-6.

Kuzi, et al. Query Expansion Using Word Embeddings,: Technion-Israel Institute of Technology, CIKM '16: Proceedings of the 25th ACM International on Conference on Information and Knowledge Management, Oct. 2016, pp. 1929-1932, https://doi.org/10.1145/2983323.2983876.

Otsuka, et al. "Query Expansion with Neural Question-to-Answer Translation for FAQ-based Question Answering," Track: First International Workshop on Hybrid Question Answering with Structured and Unstructured Knowledge (HQA'18), WWW 2018, Apr. 23-27, 2018, Lyon, France, pp. 1063-1068.

* cited by examiner

QUERY EXPANSION IN INFORMATION RETRIEVAL SYSTEMS

BACKGROUND

The present invention relates to the field of digital computer systems, and more specifically, to a method for query expansion.

Application scenarios where the initial information from a user is not complete and therefore not sufficient to accurately perform a downstream classification task or a database inquiry require the use of query expansion techniques. Examples where additional information is needed are decision support systems for risk stratification where the user provides a set of initial medical conditions and the system interacts with the end users through questions in order to identify possible missing key aspects from the medical perspective. Accurately determining the additional information may however be challenging.

SUMMARY

Various embodiments provide a method for query expansion, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for query expansion. The method comprises:
 a) receiving a current query having at least one search term;
 b) inputting the at least one search term of the current query to a set of query expansion modules, wherein the query expansion modules predict expansion terms of input terms;
 c) in response to the inputting, receiving from the set of query expansion modules candidate expansion terms of the search term;
 d) modifying the current query using at least part of the candidate expansion terms, resulting in a modified query having at least one modified search term; and
 e) repeating steps b) to d) using the modified query as the current query, the repeating being performed until a predefined stopping criterion is fulfilled.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for query expansion. The computer system is configured for:
 a) receiving a current query having at least one search term;
 b) inputting the at least one search term of the current query to a set of query expansion modules, wherein the query expansion modules predict expansion terms of input terms;
 c) in response to the inputting, receiving from the set of query expansion modules candidate expansion terms of the search term;
 d) modifying the current query using at least part of the candidate expansion terms, resulting in a modified query having at least one modified search term; and
 e) repeating steps b) to d) using the modified query as the current query, the repeating being performed until a predefined stopping criterion is fulfilled.

The present subject matter may accurately reformulate queries. The resulting queries may improve information retrieval. In particular, query-document mismatch between queries and retrieved documents may be minimized. Using multiple expansion modules may further improve accuracy of the query reformulation. The present subject matter may involve a feedback loop to control the query expansion accuracy and thus further enhance accuracy of the query expansion. The one or more terms of the current query which are input to the set of expansion modules may be named input terms. For example, the modified query that results from the present method may be executed in order to provide requested data of the query. In one example, terms of the modified query (which may be the input terms and the candidate expansion terms) may be classified into predefined classes e.g. valid, non-valid, or may be used to classify a disease defined by the expansion terms and the input terms etc.

The present subject matter may be applied to applications where the initial information provided to a system is incomplete and needs to be enriched. Such an application may for example be a medical field application, where the present subject matter may be a component of a next best question module of a decision support system for risk stratification.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The query expansion modules may for example be encoders for natural language inference. The natural language inference may be performed using models (e.g., machine learning models) based on neural networks. For example, a query expansion module of the query expansion modules may be a recurrent neural network-based sentence encoder. The query expansion modules may or may not include encoders of all of the same types. The search terms may be textual data, categorical, non-categorical, or continuous tokens. The terms of the queries may for example be strings.

According to one embodiment, the method further comprises: for each candidate expansion term of the candidate expansion terms, modifying the current query using the candidate expansion term, assigning a confidence score to the candidate expansion term using query results of the modified query, and selecting the at least part of the candidate expansion terms using the confidence scores. For example, a confidence module may be used to provide the confidence scores. The confidence module may further be configured to decide whether additional candidate terms and feedback loops are required based on the confidence scores, e.g., the stopping criterion may be fulfilled if the confidence module decides that no feedback loop is required.

In one example, the confidence module may be used to score the at least part of the candidate expansion terms as described above and to decide if a repetition of steps b) to d) (i.e., a feedback loop) is required.

According to one embodiment, the stopping criterion is any one of: the number of repetitions reached a predefined maximum number, and the difference between query results of the modified query and the current query is smaller than a predefined threshold. For example, the method further comprises executing the current query and the modified query and comparting the results (e.g., retrieved documents) of the two queries. For example, the number of retrieved documents, by each of the two queries, that contain the requested/relevant information may be compared. This embodiment may enable automatic control of the execution of the present method. The difference may, in another example, be quantified by comparing the number of retrieved and relevant documents.

According to one embodiment, the modifying of the current query comprises any one of: adding the at least part of the candidate expansion terms to the current query, and using a user defined function for aggregating the current terms of the query and the at least part of the candidate expansion terms. Aggregating the current terms of the current query and the at least part of the candidate expansion terms may be performed using the function that combines both terms into new terms of the modified query. This may enable an accurate and systematic method for expanding queries.

According to one embodiment, the user defined function is received from a user upon providing the at least part of the candidate expansion terms to the user. This embodiment may enable an interactive method for query expansion. This may speed up execution of the present method as the user may better define terms of his/her own usage such that the results of the modified query can be obtained after fewer iterations. This may enable to incorporate user response in the system.

According to one embodiment, the method further comprises increasing the number of expansion modules in each iteration of the method by one or more expansion modules. The more expansion modules used, the more candidate terms can be suggested and thus the modified query may have a higher probability to retrieve the right data needed by the user. For example, in each iteration of the method, a predefined number of expansion modules may be added to the set of expansion modules. The predefined number may, for example, be one, two, or three. For example, the method may provide an initial group of expansion modules, wherein the set of expansion modules used in each iteration of the present method is a subgroup of the group. For example, in the first execution of the method the set of expansion modules comprises 10 expansion modules and in the first iteration the set of expansion modules may be increased to 12 expansion modules and so on. In each iteration of the method, the inputting and the receiving steps of the method may be performed using the incremented set of expansion modules.

According to one embodiment, the candidate expansion terms comprising sets of candidate expansions terms of the respective set of query expansion modules. The method further comprises: combining the sets of candidate expansion terms for obtaining the at least part of the candidate expansion terms, the combining comprising any one of: de-duplicating the sets of candidate expansion terms, thereby the at least part of the candidate expansion terms comprises distinct terms, or inputting the sets of candidate expansion terms into a trained deep neural network, named ensemble layer (or ensemble system), and obtaining an output comprising the at least part of the candidate expansion terms or selecting the at least part of the candidate expansion terms by applying a rule-based selection based on probabilities associated with the candidate expansion terms.

In one example, the method further comprises selecting, from the sets of candidate expansion terms, candidate expansion terms by applying a rule-based selection based on probabilities associated with the sets of candidate expansion terms and inputting the selected candidate expansion terms to the ensemble layer to obtain an output comprising the at least part of the candidate expansion terms.

For example, each candidate expansion term of the sets of candidate expansion terms is associated with an initial probability as obtained by the respective query expansion module. Applying the rule-based selection may comprise: identifying one or more sets of duplicate candidate expansion terms of the sets of candidate expansion terms, or combining probabilities of each set of duplicate candidate expansion terms. The combination may for example comprise an average of the probabilities, or a weighted sum of the probabilities. The weighed sum may be performed using weights associated with the set of expansion modules e.g., each expansion module of the set of expansion modules may be associated with a user defined weight. This may result in each distinct candidate expansion term being associated with a probability which is the result of the combination or which is the initial probability. These probability values may be used to rank the distinct expansion terms, and the first N (e.g. N=3) ranked candidate expansion terms may be selected. N may for example a user defined number.

By combining the sets of candidate expansion terms, the best of them may be obtained which may then increase the accuracy of the query reformulation.

According to one embodiment, the method further comprises training the set of expansion modules and the ensemble layer comprising one of: jointly training the set of expansion modules and the ensemble layer, so that the ensemble layer is trained by outputs of the set expansion modules, and training each of the set of expansion modules and the ensemble layer separately. This may further increase the accuracy of the query reformulation as a separate training may avoid biasing the results/outputs of the trained components. For example, each query expansion module is either trained separately or jointly using predefined ensemble methods. These ensemble methods may be learnt, either separately or together with other query expansion modules, or rule-based (e.g., by averaging or weighted sum). The present method may comprise an inference process which uses the already trained query expansion modules to perform the query expansion prediction task.

The ensemble layer may for example comprise a deep neural network whose input layer having a size defined by the number of input terms, wherein the input terms may be all the sets candidate expansion terms or the number of terms that result from the rule-based selection. A training set may be defined according to the structure of the deep neural network. The training set may for example be built using the query masking method as described herein.

According to one embodiment, each query expansion module of the query expansion modules comprises an encoder and an outputting module, the outputting module being configured to predict the expansion terms of the input terms using outputs generated by the encoder from the input terms or to perform a classification of the outputs. In case the outputting module performs the classification, the outputting module may be named a classifier. The encoder may for example be an attention-based encoder. The training of the encoders and the training of the outputting module may be performed jointly or separately.

The input terms of each of the query expansion modules may comprise terms of the current query and masked terms or unknown terms for which expansion terms may be provided. The encoder may be configured to generate the vector representations of at least part of the input terms e.g., the encoder may generate the vector representations of all the input terms or generate the vector representations of all terms of the current query and vector representations for at least part of the unknown terms. For example, if the input terms comprise 10 terms, 6 of them are the terms of the query and remaining 4 are unknown, the encoder may provide 10 vector representations as outputs (e.g., like Word2Vec representations). In one use case, all the vector representations may be used to perform the classification. In another use case, only vector representations of the unknown terms may be used to predict expansion terms. Following the above example, 10 vector representations may be used to perform a classification and the 4 vector representations of the unknown terms may be used to determine the expansion terms.

According to one embodiment, each query expansion module of the query expansion modules comprises an attention-based encoder and a classifier, the classifier being configured to predict the expansion terms of the input terms and/or to classify them using outputs of the encoder generated from the input terms. With the present method, the order of the terms in the query may not be taken into account when using the transformer's encoder. According to one embodiment, the attention-based encoder does not receive encoder positions.

According to one embodiment, the classifier and the attention-based encoder are jointly trained. For example, the query expansion module might be jointly trained with a defined downstream classification task, where candidate queries are expanded to optimize both query expansion and the classification. The training of the classifier and the query expansion module may be coupled by error backpropagation. For example, the query expansion is used to enrich the query with additional relevant information. This may be useful for tasks like data completion but may have high potential to improve the performance of downstream tasks for which this additional information is used. For the former, the system can be used as a standalone component, and for the latter the training can be jointly performed with the downstream task, optimizing for both relevant query expansion and increased performance in the added task. In this case the training may be performed optimizing two error functions simultaneously.

Each of the query expansion modules is trained using a respective different training set. Or, each of the query expansion modules is trained using a same training set. According to one embodiment, each of the attention-based encoders is trained using a different training set. The training sets may be generated using the masking as described herein, but each training set of each expansion module has a different content. For example, the set of expansion modules may comprise neural network models. The neural network models may be trained in parallel in order to increase the overall performance. Different sampling criteria to build the training data (comprising the masking procedure) might be used. The results from each model may for example be combined in the ensemble layer with a weighted sum or a fully connected neural network layer to retrieve the final output together with an associated confidence score. The final output is used to enrich the initial query of relevant information which can improve a downstream classification task.

According to one embodiment, each of the attention-based encoders is trained using a same training set.

According to one embodiment, the method further comprises generating a training dataset by masking, multiple times, terms of at least one training query, resulting in masked training queries, training the encoder using the masked training queries which are labelled by respective non-masked training queriers.

By taking out (i.e., masking) features of queries, the masked features become the most relevant candidates for query expansion. During the training process, the encoder is optimized to predict the masked features from the remaining, non-masked ones, terms.

According to one embodiment, the masking is performed using any one of: uniform masking, inverse log-probability masking, and inverse probability masking.

According to one embodiment, each expansion module of the set of expansion modules is configured to perform the prediction by one of: finding synonyms of words, finding semantically related words, finding the various morphological forms of search terms by stemming each of the search terms of the query, and fixing spelling errors.

According to one embodiment, the method is automatically performed.

According to one embodiment, each of the query expansion modules comprises an encoder of one of the following types: transformer-based encoder, convolutional neural networks (CNNs) based encoder, recurrent neural networks (RNNs) based encoder, and fully connected network based encoder.

Figure 1:
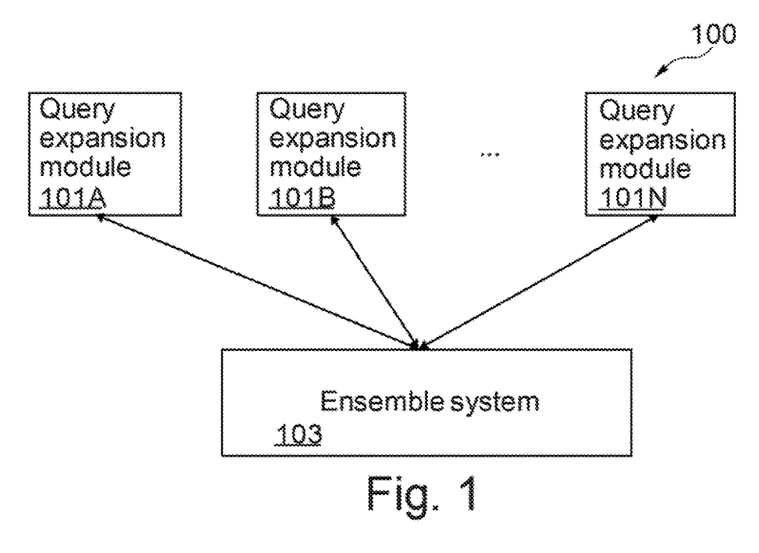
FIG. 1 is a block diagram of a computer system for query expansion according to at least one embodiment.

FIG. 1 illustrates a block diagram of a computer system 100 for query expansion in accordance with an example of the present subject matter.

The computer system 100 comprises query expansion modules 101A-N and an ensemble system 103. Each of the query expansion modules may be configured to receive query terms e.g. from the ensemble system 103, and generates a set of one or more expansion terms of the received query terms. The query expansion modules may be configured to receive input terms (e.g., with predefined input size) and masked input terms. The masked input terms may be predicted by the computer system 100.

The ensemble system 103 may be configured to reformulate queries using the expansion terms. This may enhance the information retrieval effectiveness and performance in information retrieval operations. The ensemble system 103 may be configured to provide a final set of expansion terms based on candidate terms received from the query expansion modules 101A-N. The ensemble system 103 may for example use a confidence module to decide if the modified query resulting from the final set is accurate enough or needs a further reformulation.

Each of the query expansion modules 101A-N may be configured to generate expansion terms by performing at least one of: finding synonyms of words, finding semantically related words (e.g., antonyms, meronyms, hyponyms, hypernyms), finding the various morphological forms of search terms by stemming each of the search terms of the query and fixing spelling errors.

For example, the query terms may be received from a search system (not shown) provided by a third party. The query expansion modules 101A-N and/or the ensemble system 103 may be in communication with the search system. For example, the query expansion modules 101A-N may include one or more interfaces (e.g., application programming interface) with which to communicate with the search system. In one example, each of the query expansion modules 101A-N may be implemented at least in part as a software program. In other example, each of the query expansion modules may be implemented at least in part as a hardware module.

The computer system 100 may further comprise an outputting layer (or outputting module) associated with each of the query expansion modules e.g., each of the query expansion modules may form an integral part with the outputting layer. The outputting layer may be configured to receive the outputs of the associated query expansion module. The outputting layer may further be configured to use the outputs corresponding to the masked terms to predict the masked words (expansion terms). The prediction of a given output may be one or more words associated with respective probabilities. The outputting layer may be configured to output the expansion terms (and the input terms) in a predefined vector format. The outputting layer may further be configured to classify the outputs into predefined classes.

The computer system 100 may be configured to automatically reformulate received queries and obtain search results of the reformulated queries. In another example, the query reformulation may be performed by prompting a user to provide a user function that enables to reformulate a query using the expansion terms.

Figure 2:
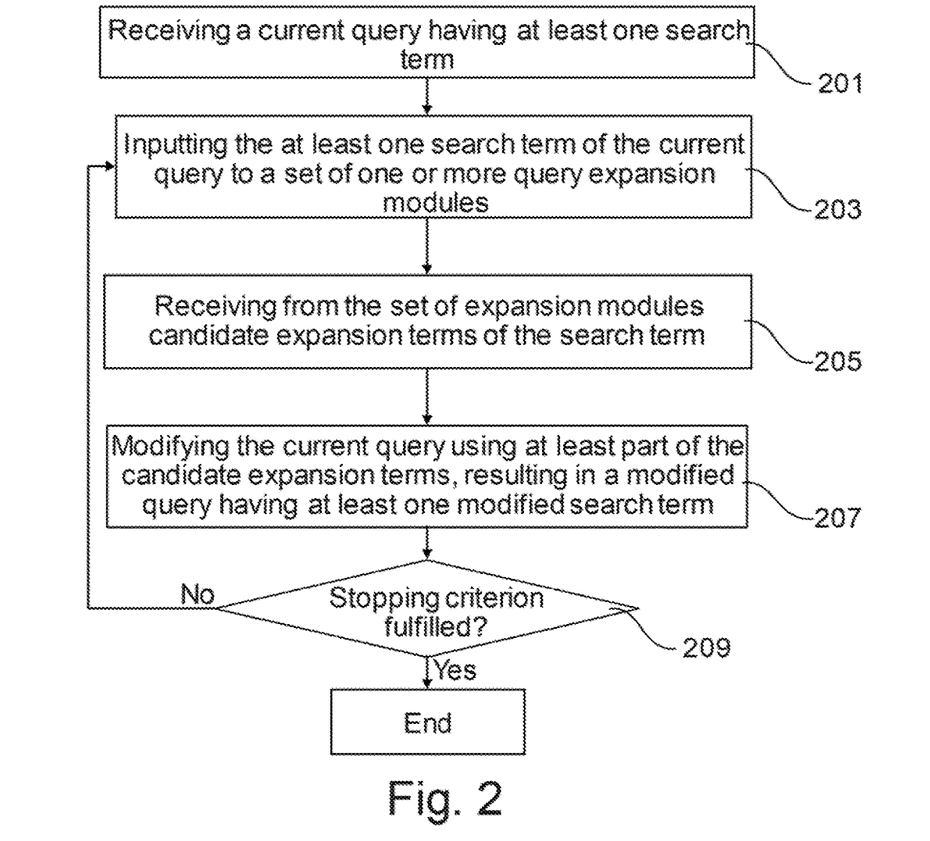
FIG. 2 is an operational flowchart illustrating a process for query expansion according to at least one embodiment.

FIG. 2 depicts a flowchart of a method for query expansion in accordance with an example of the present subject matter.

A current query having at least one search term may be received in step 201. For example, the received query may request certain data in a given database using the at least one search term. In one example, the at least one search term may comprise one search term. In one example, the at least one search term may comprise multiple search terms. However, the search terms of the received query may not be accurate enough to extract the right information. For example, different users may use different search terms for retrieving the same information. For that purpose, the present method may enhance the received query as follows.

In step 203, the search terms of the current query may be input to a set of one or more query expansion modules (e.g., 101A-N). The number of query expansion modules in the set of expansion modules may be changed over time, e.g., in each iteration of the present method one or more expansion modules may be added to the set of expansion modules to be used in a next iteration. For example, the set of expansion modules may initially comprise one single query expansion module 101A. Using more than one expansion module may increase the reformulation accuracy of the received query and may thus improve the performance of the data retrieval. The reformulation accuracy may increase as multiple suggestions can be provided by different query expansion modules, and the best of them can be used to reformulate the query. This may particularly be advantageous if the query expansion modules use different techniques to predict or determine the expansion terms of one or more input terms.

A set of candidate expansion terms of the search terms may be received in step 205 from each expansion module of the set of expansion modules. If the set of expansion modules comprises a single expansion module, one set of candidate expansion terms may be received in step 205. The one or more sets of candidate expansion terms may be preprocessed before being used for reformulating or modifying the current query. The preprocessing of the one or more sets of candidate expansion terms may be performed so as to increase the data retrieval performance based on the preprocessed terms. The preprocessed terms may comprise at least part of all the received candidate expansion terms. In one example, the one or more sets of candidate terms may be deduplicated (as part of the preprocessing) to obtain distinct expansion terms that form the preprocessed terms. In one example, the preprocessing may comprise applying a rule based selection based on probabilities associated with the sets of candidate expansion terms. In one example, the preprocessed terms may be provided as the final expansion terms. In another example, the preprocessed terms may be input to the ensemble layer for obtaining the final expansion terms from the ensemble layer.

The current query may be modified in step 207 using at least part of the sets of candidate expansion terms. This may result in a modified query having one or more terms that may be named modified search terms. The at least part of the sets of candidate expansion terms may be the preprocessed terms e.g., the deduplicate terms or the final expansion terms obtained from the ensemble layer. The current query may automatically be modified by, for example, adding the at least part of the sets of candidate expansion terms to the current query or by using a function that combines the search terms of the current query with the at least part of the sets of candidate expansion terms into the new terms of the modified query. In one example, a user may be prompted to provide a modified query based on the at least part of the sets of candidate expansion terms and the current query and the modified query may be received from the user.

It may be determined (inquiry step 209) if a stopping criterion is fulfilled. If the stopping criterion is not fulfilled steps 203 to 209 may be repeated using the modified query as the current query. That is, in step 203, the modified search terms (search terms of the modified query) may be input to the set of expansion modules and so on. If the stopping criterion is fulfilled, the resulting modified query and/or the final expansion terms may be provided. In one example, the method may further comprise retrieving data using the modified query or classifying the final expansion terms.

Figure 3:
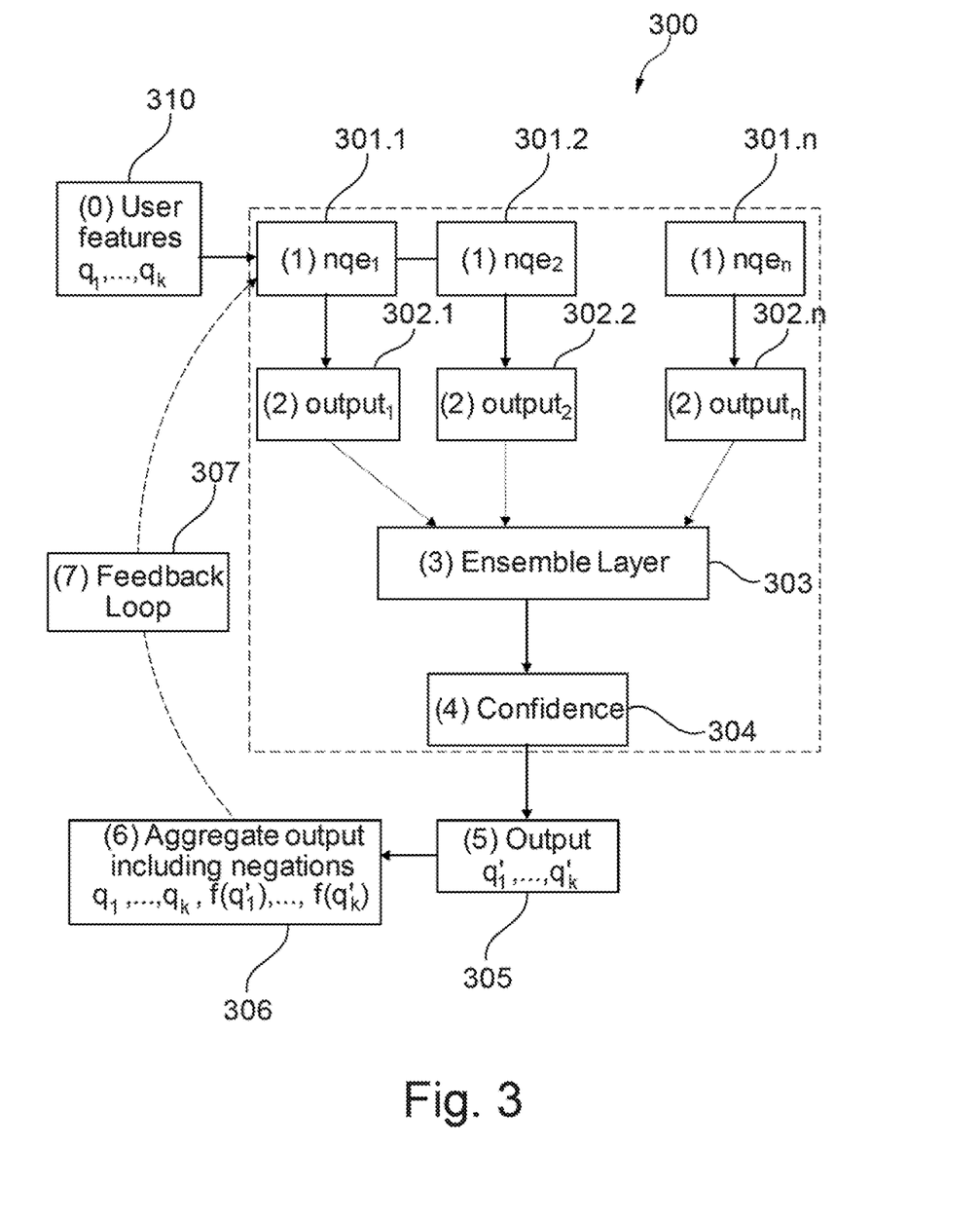
FIG. 3 is a block diagram of a computer system for query expansion according to at least one embodiment.

FIG. 3 is a block diagram of a computer system 300 for query expansion in accordance with an example of the present subject matter.

The computer system 300 comprises a set of query expansion modules 301.1-301.$n$. The set of query expansion modules 301.1-301.$n$ may be neural expansion models as each of which may be based on a neural network architecture. Each of the set of query expansion modules 301.1-301.$n$ may be configured to receive a set of search terms (q1 ... qk) 310 of a query. Each of the set of query expansion modules 301.1-301.$n$ may be configured to output a set of candidate expansion terms 302.1-302.$n$ upon receiving the set of search terms 310. Each set of terms of the sets of candidate expansion terms 302.1-302.$n$ may be provided with their respective rankings (e.g., based on prediction probabilities).

An ensemble layer or ensemble system 303 may be configured to receive the sets of candidate expansion terms 302.1-302.$n$ and to combine them in order to compute a final set of expansion terms 305. The computer system 300 may further comprise a confidence module 304 that is responsible for the decision whether additional outputs are required based on the final set of terms 305. If it is decided that additional outputs may be needed, the final set of terms 305 may be aggregated with the search terms 310 in order to obtain modified search terms 306. For example, the final set of terms may be aggregated with the initial query 310 depending on a supervised feedback which determines the way how the query terms are integrated into the original query 310 through a function f as shown in FIG. 3.

The computer system 300 may further comprise a feedback loop module 307 that receives the modified search terms 306 and input them to the set of expansion modules 301.1-301.$n$ for another iteration. For example, the feedback loop module 307 may be used to incorporate the final query expansion candidates into the original query. The feedback loop module 307 may define if and in what manner these terms are incorporated in the next iteration. This can be done either automatically, as a function of the original, non-masked training data or with an actual user feedback.

The search terms 310 may comprise word tokens, numerical range tokens, class tokens, mask tokens, padding tokens, and action tokens can be defined. These reflect the changes in the query for each possible user feedback type. In the example where the feedback can be positive (the term is relevant), negative (the term is not relevant) or uncertain (it is not known whether the term is relevant), the action tokens could be negated token, positive token and uncertain token respectively. For instance, for given input sequence [A, B] and candidate terms [C, D, E] and actions positive, negated and uncertain, the next iteration query sequence is [A, B, C, negated token, D, uncertain token, E] if C is relevant, D not and E uncertain. Internal representations of action tokens are learnt during training.

Figure 4A:
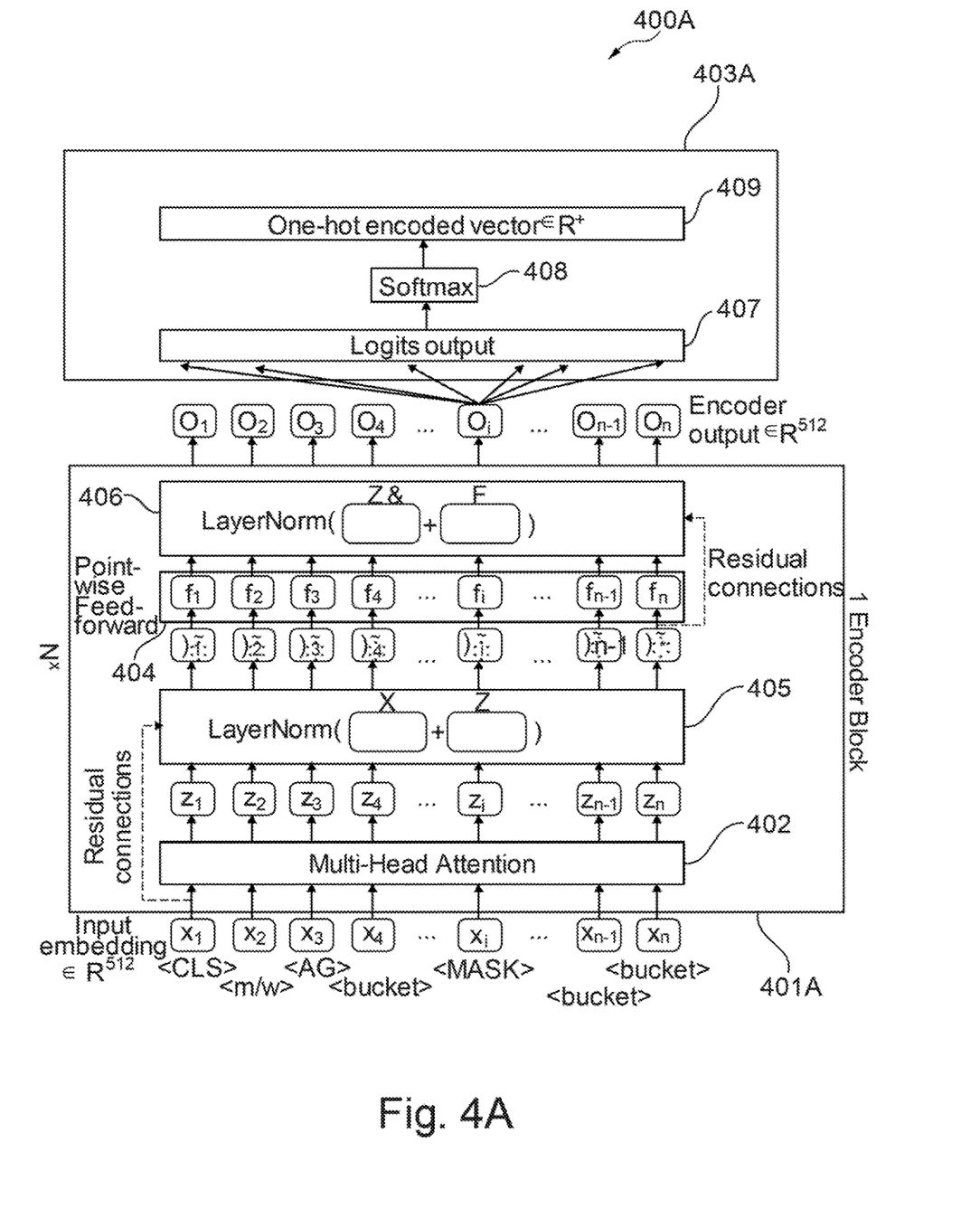
FIG. 4A is a block diagram of an ensemble system for query expansion according to at least one embodiment.

FIG. 4A is a block diagram of an ensemble system 400A for query expansion in accordance with an example of the present subject matter. The ensemble system may for example be the ensemble system 103 or 303 as described above.

The ensemble system 400A may comprise an encoder 401A and an outputting module 403A (or outputting layer).

The input set of query terms may be a vector representation of initial tokens. The input set of query terms x1 ... xn are received at a multi-head-attention layer 402 that helps the encoder look at other words in the input set as it encodes a specific word. The outputs of the multi-head-attention layer 402 are fed to a feed-forward neural network 404. Each of the two layers 402 and 404 has a residual connection around it, and is followed by a layer-normalization step 405 and 406. The outputs o1 ... on of the encoder 401A which are associated with the masked terms are received at a linear layer which may be a fully connected neural network that projects the outputs o1 ... on into a larger vector called a logits vector. A softmax layer 408 may provide probabilities using the logits outputs. The resulting terms may be provided as a one hot encoded vector 409. For example, the output of of the masked term xi may be used to predict the masked word. The prediction may be one or more words associated with respective probabilities. In another example, the outputting layer 403A may be used as a classifier that receives all outputs of to on and to do a classification based on the outputs.

Figure 4B:
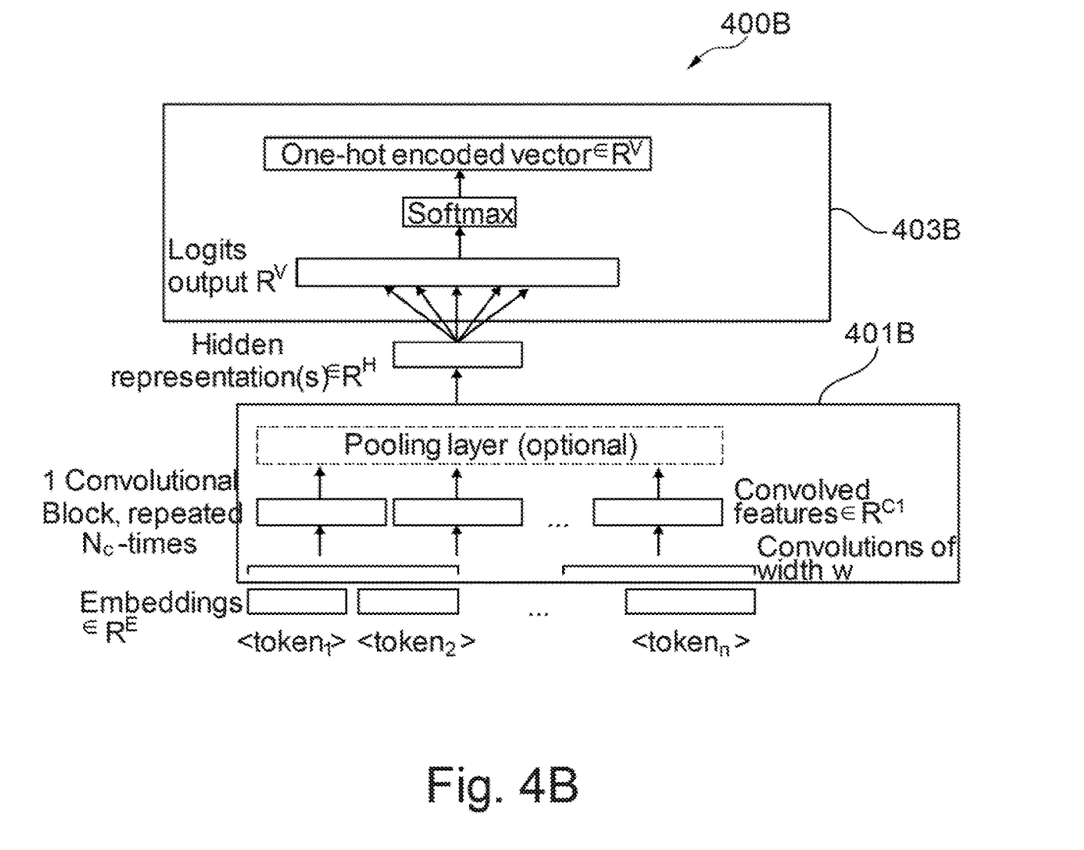
FIG. 4B is a block diagram of an ensemble system for query expansion according to at least one embodiment.

FIG. 4B is a block diagram of an ensemble system 400B for query expansion in accordance with an example of the present subject matter. The ensemble system 400B may comprise an encoder 401B and an outputting module 403B.

The ensemble system of FIG. 4B is similar to the ensemble system of FIG. 4A with the encoder 401A is replaced by a CNN based encoder 401B.

Figure 4C:
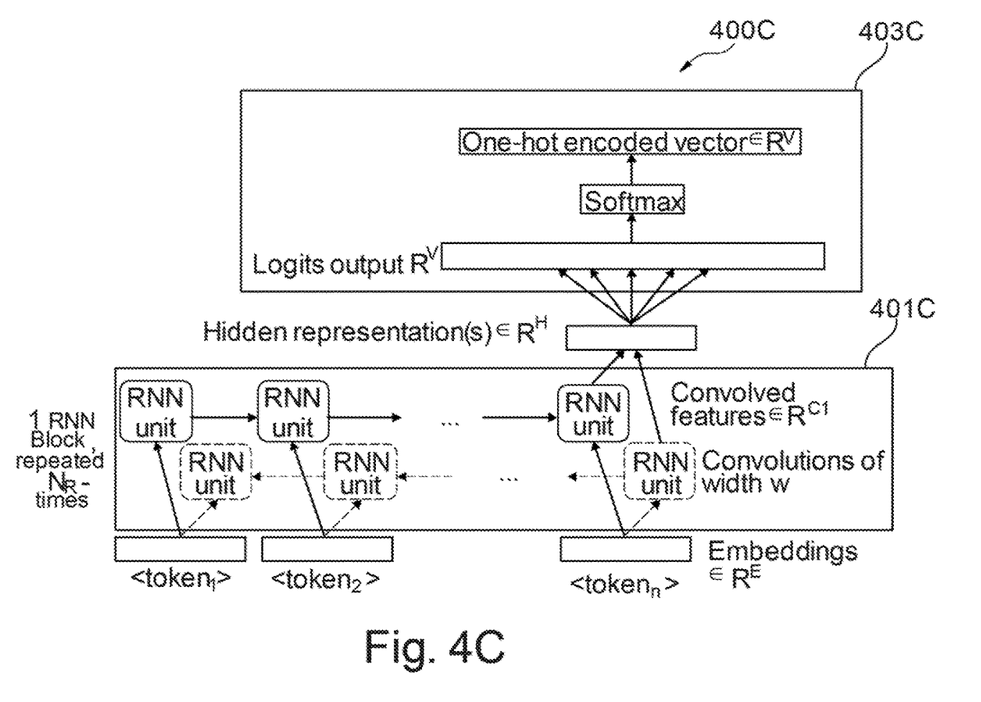
FIG. 4C is a block diagram of an ensemble system according to at least one embodiment.

FIG. 4C is a block diagram of an ensemble system 400C for query expansion in accordance with an example of the present subject matter. The ensemble system 400C may comprise an encoder 401C and an outputting module 403C.

The ensemble system of FIG. 4C is similar to the ensemble system of FIG. 4A with the encoder 401A is replaced by a RNN based encoder 401C.

Figure 5:
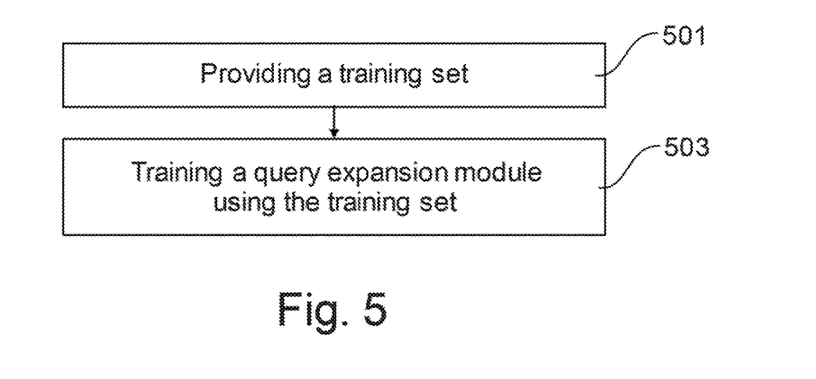
FIG. 5 is a flowchart of a method for training a query expansion module according to at least one embodiment.

FIG. 5 depicts a flowchart of a method for training a query expansion module e.g., 101A, in accordance with an example of the present subject matter. The method of FIG. 5 may be described with reference to the architecture of FIG. 4A.

The query expansion module may for example have an encoder architecture similar to transformer architectures for mask language modeling to train the machine learning model for the query expansion task. The structure of the query expansion module is shown in FIG. 4A. The encoder component might be replaced with CNN or RNN architectures. The architecture in FIG. 4A has been adapted to not use position embeddings, and it is trained on the mask language modelling task only and does not include the modification needed to perform the next sentence prediction. The mask token may always be present in the input and the last layer (encoder output layer) may always be connected to the hidden representation of the mask token/tokens and might vary depending on how many tokens are masked.

The goal of the training process is to optimize the module's parameters for predicting good candidates for query expansion. In step 501, a training sample may be generated by masking one or more features from each query. Several masking mechanisms might be applied, e.g., uniform masking, inverse log-probability masking, inverse probability masking or custom heuristics that make the masking a function of sample characteristics (e.g., label, if given). The training sample may for example comprise pairs of non-masked queries and corresponding masked queries.

The query expansion module 101A may be trained in step 503 using the generated training sample. The training is focused on optimizing the prediction of the masked tokens. According to some embodiments, an assumption of the training may be that the most relevant missing features from a case are the masked ones. This allows to formulate a next best question generation in terms of an optimization problem. In other words, the main task is query expansion instead of language modelling. The difference of the present method with respect to the training of language modelling task is that the latter may be used for general language understanding but not optimized for the prediction of the masked words.

The performance of a single neural query expansion module 101A of the present subject matter is compared with several information retrieval algorithms used for the same task. In particular, 800,000 patient records from a telemedicine provider may be used for the comparison. Each record is represented by a sequence of symptoms as well as age and gender information. The total number of possible symptoms, i.e., word features, is 17,858. During training, a randomly masking of one of the features in each training case is performed and the network is optimized to predict the obscured feature. 560,000 cases are used for training, 80,000 cases for validation and 160,000 cases for testing. The testing results on the 160,000 unseen test cases are shown in the following table. A random classifier may only achieve an accuracy of 5.6·10-5 (inverse of the number of word features) for the top one prediction.

| Model | Acc@1 | Acc@5 | Acc@10 |
|---|---|---|---|
| f | 0.0095 | 0.087 | 0.175 |
| BIM | 0.0093 | 0.037 | 0.0578 |
| CHI | 0.0019 | 0.0336 | 0.0664 |
| RSV | 0.0107 | 0.0873 | 0.170 |
| KLD | 0.0016 | 0.0654 | 0.138 |
| NQE | 0.13 | 0.26 | 0.34 |

The table shows the performance of a single neural query expansion unit (NQE) 101A with the following rankers: i) frequency-based ranker (f), ii) binary independence model (BIM), iii) $\chi^2$ value (CHI), iv) Robertson selection value (RSV), v) Kullback-Leibler divergence (KLD, relative entropy).

The frequency-based ranking of the terms (f) ranks the most often occurring symptoms the highest, while low-occurrent ones are ranked lower as in the formula:

$$F(s, R) = \sum_{r \in R} I_{s \in r},$$

where R is the set of relevant cases retrieved, s is the token to be ranked and I the identity if the token s belongs to the set r, zero otherwise.

The binary independence model (BIM) ranks symptoms based on the equation:

$$BIM(s, R, N) = \log \frac{p(s|R) \cdot [1 - p(s|N)]}{p(s|N) \cdot [1 - p(s|R)]},$$

where s denotes the symptom to be ranked, R is the set of relevant retrieved cases and N is the case base. p(s|R) and p(s|N) stand for the probabilities of the symptom occurring in the relevant set of cases and the whole case base respectively. The exact probabilities are unknown, but can be approximated with the counts.

The $\chi^2$ value is used to determine whether in general there is a significant difference in expected values of two events. These two events are the query occurrence in the relevant set of cases and the occurrence in the whole set of historical cases. The definition is given in the equation:

$$CHI(s, R, N) = \log \frac{[p(s|R) - p(s|N)]^2}{p(s|N)}.$$

The Kullback-Leibler divergence (KLD, relative entropy) of the aforementioned probabilities is used as a term ranking metric. It is defined as written in the equation:

$$KLD(s, R, N) = p(s|R) \cdot \log \frac{p(s|R)}{p(s|N)}.$$

KLD is a measure of how two probability distributions differ from each other.

The Robertson selection value (RSV) ranks the symptoms based on the product of their differences in occurrence probabilities and their term weight for each document in the relevant records. This is intuitively promising as certain tokens might be low-occurrent compared to others, yet of major importance for the downstream classification task, which is captured by a higher term weight. RSV is described in the equation:

$$RSV(s, R, N) = \sum_{r \in R} w(s, r) \cdot [p(s|R) - p(s|N)],$$

where w(s, r) denotes the weight of term s in the given relevant record r.

Figure 6:
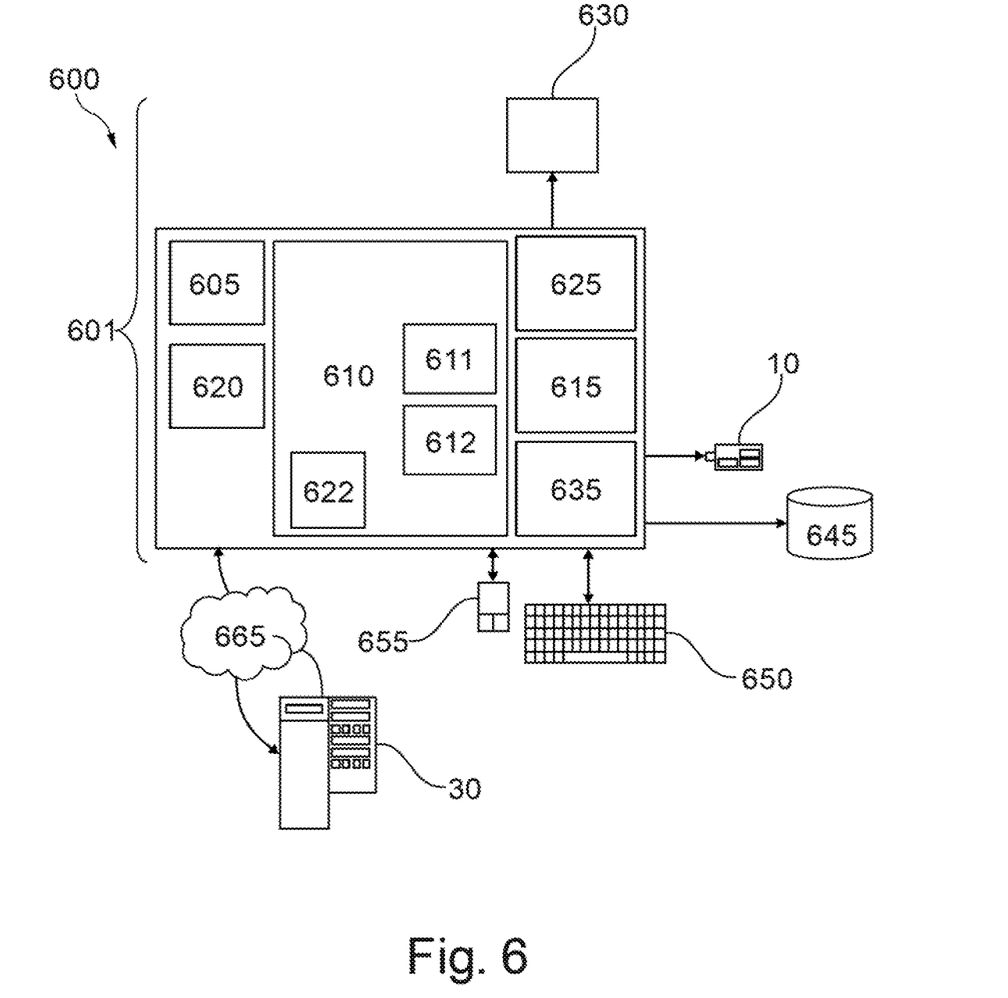
FIG. 6 is a diagram illustrating analysis bins in accordance with an example of an embodiment of the present disclosure.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) in firmware 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for query expansion, the method comprising:
   a) receiving a current query having at least one search term;
   b) inputting the at least one search term of the current query to a set of query expansion modules, wherein the set of query expansion modules predict expansion terms of input terms, wherein the set of query expansion modules include a specified number of query expansion modules with each query expansion module comprising a machine learning model, and wherein each query expansion module further comprises an encoder and an outputting module to predict the expansion terms using outputs generated by the encoder;

c) in response to the inputting, receiving from the set of query expansion modules candidate expansion terms of the search term;

d) modifying, by the set of query expansion modules, the current query using at least part of the candidate expansion terms, resulting in a modified query having at least one modified search term; and e) repeating steps b) to d) using the modified query as the current query, the repeating being performed until a predefined stopping criterion is fulfilled, wherein the repeating further comprises adjusting in each iteration of the method the specified number of query expansion modules used for predicting the expansion terms and modifying the current query.

2. The method of claim 1, further comprising: for each candidate expansion term of the candidate expansion terms, modifying the current query using the candidate expansion term, assigning a confidence score to the candidate expansion term using query results of the modified query, and selecting the at least part of the candidate expansion terms based on the confidence scores.

3. The method of claim 1, wherein the stopping criterion is selected from the group consisting of (i) a number of repetitions reached a predefined maximum number and (ii) a difference between query results of the modified query and the current query is smaller than a predefined threshold.

4. The method of claim 1, wherein modifying the current query includes adding the at least part of the candidate expansion terms to the current query or using a user defined function for aggregating one or more current terms of the current query and the at least part of the candidate expansion terms.

5. The method of claim 4, wherein the user defined function is received from a user in response to providing the at least part of the candidate expansion terms to the user.

6. The method of claim 1, further comprising increasing the set of query expansion modules in each iteration of the method by one or more expansion modules.

7. The method of claim 1, wherein each query expansion module of the set of query expansion modules performs the prediction by a technique that is selected from the group consisting of: finding synonyms of words, finding semantically related words, finding various morphological forms of search terms by stemming each of the search terms of the current query, and fixing spelling errors.

8. The method of claim 1, the method being automatically performed.

9. A computer program product for query expansion, comprising a computer-readable storage medium having program instructions embodied therewith, the program instructions executable by a processor to cause the processor to perform a method comprising:

a) receiving a current query having at least one search term;

b) inputting the at least one search term of the current query to a set of query expansion modules, wherein the set of query expansion modules predict expansion terms of input terms, wherein the set of query expansion modules include a specified number of query expansion modules with each query expansion module comprising a machine learning model, and wherein each query expansion module further comprises an encoder and an outputting module to predict the expansion terms using outputs generated by the encoder;

c) in response to the inputting, receiving from the set of query expansion modules candidate expansion terms of the search term;

d) modifying, by the set of query expansion modules, the current query using at least part of the candidate expansion terms, resulting in a modified query having at least one modified search term; and e) repeating steps b) to d) using the modified query as the current query, the repeating being performed until a predefined stopping criterion is fulfilled, wherein the repeating further comprises adjusting in each iteration of the method the specified number of query expansion modules used for predicting the expansion terms and modifying the current query.

10. A computer system for query expansion, the computer system comprising:

one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:

a) receiving a current query having at least one search term;

b) inputting the at least one search term of the current query to a set of query expansion modules, wherein the set of query expansion modules predict expansion terms of input terms, wherein the set of query expansion modules include a specified number of query expansion modules with each query expansion module comprising a machine learning model, and wherein each query expansion module further comprises an encoder and an outputting module to predict the expansion terms using outputs generated by the encoder;

c) in response to the inputting, receiving from the set of query expansion modules candidate expansion terms of the search term;

d) modifying, by the set of query expansion modules, the current query using at least part of the candidate expansion terms, resulting in a modified query having at least one modified search term; and e) repeating steps b) to d) using the modified query as the current query, the repeating being performed until a predefined stopping criterion is fulfilled, wherein the repeating further comprises adjusting in each iteration of the method the specified number of query expansion modules used for predicting the expansion terms and modifying the current query.

* * * * *